Feb. 28, 1956
F. C. MOCK
AFTERBURNING AND EXHAUST NOZZLE
CONTROLS FOR GAS TURBINE ENGINE
2,736,166
Filed May 8, 1948
2 Sheets-Sheet 1
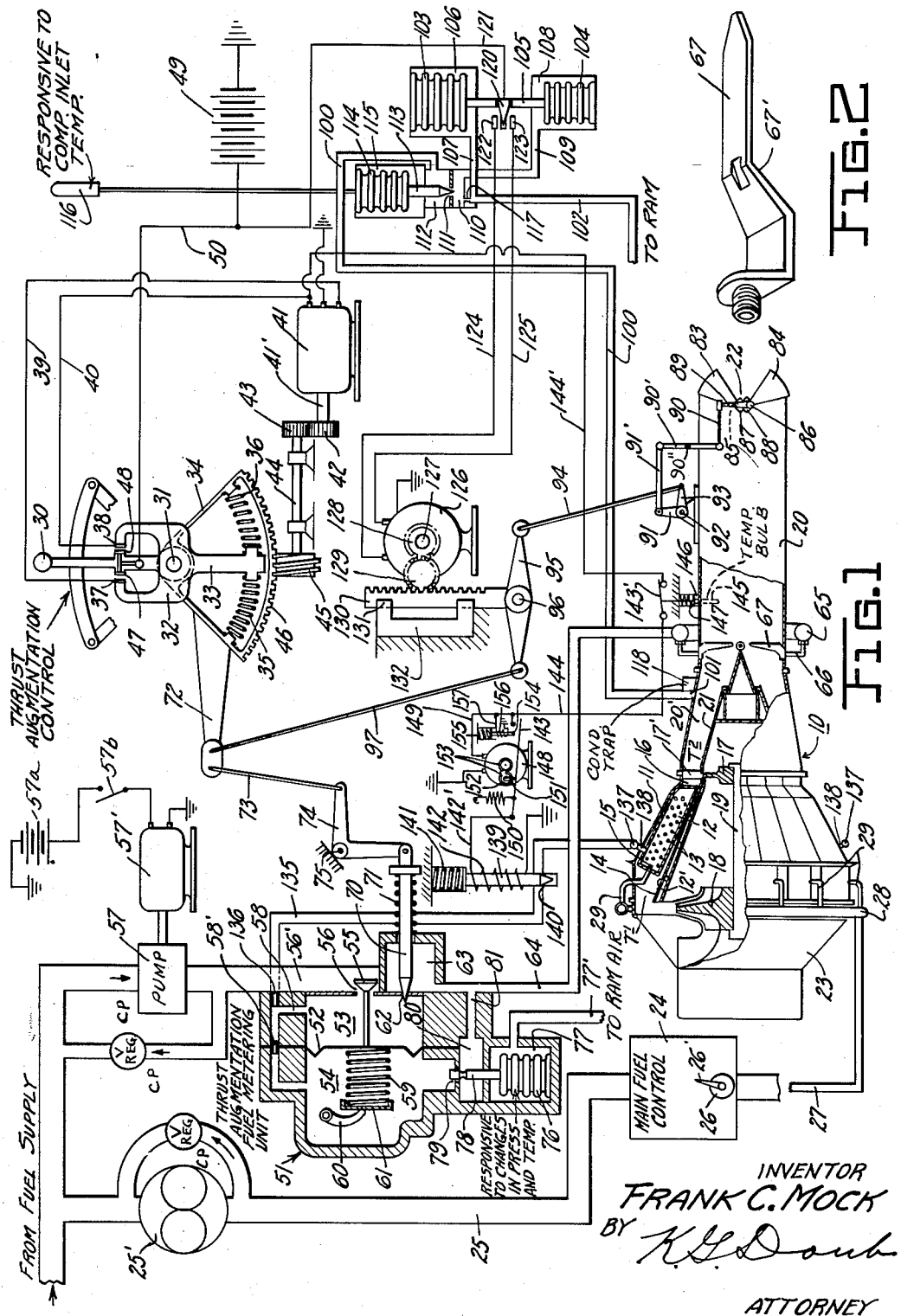
INVENTOR
FRANK C. MOCK
BY
ATTORNEY

United States Patent Office 2,736,166
Patented Feb. 28, 1956

2,736,166

AFTERBURNING AND EXHAUST NOZZLE CONTROLS FOR GAS TURBINE ENGINE

Frank C. Mock, St. Joseph, Ind., assignor to Bendix Aviation Corporation, South Bend, Ind., a corporation of Delaware Application May 8, 1948, Serial No. 25,828

29 Claims. (Cl. 60—35.6)

This invention relates to turbojet engines for aircraft, and is particularly concerned with (1) means for obtaining thrust augmentation in such engines by burning fuel in the tail pipe or tail cone section of the engine, and (2) means for controlling exhaust nozzle area during all conditions of engine operation with or without tailpipe burning.

This method of obtaining thrust augmentation is commonly termed "tail pipe burning" or "after-burning"; it consists in injecting and burning fuel in the tail cone section after the turbine, or between the latter and the exhaust nozzle or jet. The fuel-air ratio in turbojet engines of the type with which the present invention is concerned is, under normal operating conditions, so lean as to leave a large portion of the oxygen in the air charge unburned. For example, a given engine may operate under normal conditions on an air-fuel ratio of about sixty-to-one, producing a temperature of say 1600° F. at a pressure of 55 p. s. i. in the burner system before the turbine, and after the turbine say 1200° F. and 15 to 20 p. s. i. Thus, by injecting and burning additional fuel in the air charge after the drop across the turbine, a rise in pressure and temperature in the tail cone section and resultant increase in thrust at the exhaust nozzle may be attained.

Tail pipe or afterburning, however, presents certain problems: it tends to upset a balanced condition between the turbine and compressor; it calls for effective distribution of the fuel in the tail cone area and proper regulation of the area of the reaction jet or exhaust nozzle; it requires coordinated regulation of fuel feed and reaction jet or exhaust nozzle area; and the rate of fuel feed should be a function of pressure and temperature of the air flowing to the engine.

The primary object of the present invention, therefore, is to provide an improved system for obtaining thrust augmentation by tail pipe or afterburning.

Other and more specific objects are:

To coordinate the rate of fuel feed and reaction jet or exhaust nozzle area for maximum overall engine thrust efficiency;

To provide a fuel control tail pipe burning or afterburning systems which may be operated independently of or in coordinated relation with the main fuel control;

To provide mechanism for controlling the area of the reaction jet during all conditions of engine operation, with or without afterburning, in such a manner that a preselected ratio of two operating gas pressures is maintained;

To provide improved tail pipe or afterburning fuel ignition means;

To provide a tail pipe or afterburning system for turbojet engines for aircraft which will automatically compensate for changes in pressure and temperature of the air flowing to the engine;

And to otherwise improve thrust augmentation systems of the type specified, as will become apparent in view of the following description taken in conjunction with the drawings, wherein:

Figure 1 is a schematic view of a turbojet engine and coacting tail pipe or afterburning control in accordance with the invention;

Figure 2 is a detail view in perspective of one of the afterburning fuel diffuser or jet bars.

Figure 3:
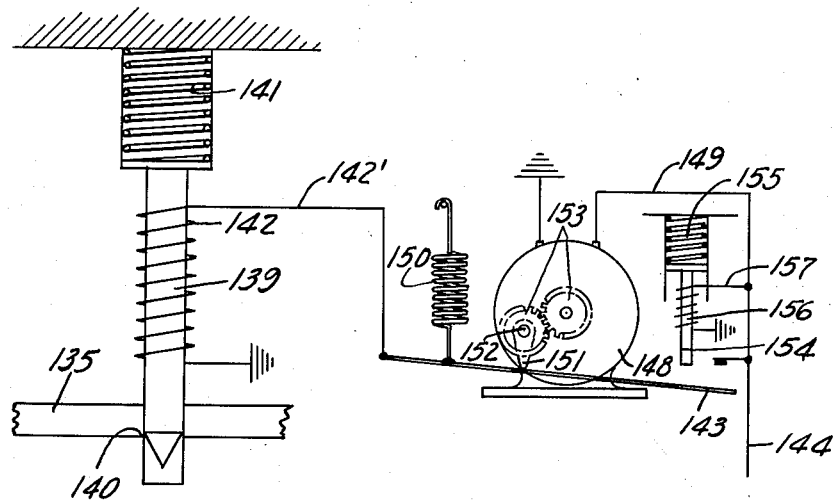
Figure 3 is an enlarged view of afterburner fuel ignition means shown in Figure 1.

The turbojet engine shown more or less diagrammatically in Figure 1, and generally indicated at 10, includes a group of burner units or combustion chambers each made up of an outer casing 11 in which is mounted a flame tube 12, the walls of which are formed with a series of openings 13 for admitting air thereinto from the space 12'. A series of air adapters or headers 14 are detachably connected to the front end of the burner assembly to direct air under pressure to the space 12', where part of the air enters through the holes 13 and mixes with the fuel discharged from burner nozzles 15 (one for each flame tube) to effect combustion, the expanded air and products of combustion being discharged from the said tubes through stator blades 16 and turbine blades 17', the latter forming part of a turbine rotor 17. A dynamic compressor is generally indicated at 18; it is shown as being of the centrifugal type but may, of course, be of the axial flow type; it is driven from the turbine and is shown mounted on a shaft 19 common to the turbine rotor and compressor.

Beyond the turbine is the tail cone 20' and tail pipe 20. A diffuser 21 and other parts to be described are mounted in the tail cone. At its outlet end the tail pipe 20 terminates in a reaction jet or exhaust nozzle 22, the area of which is adjustable or variable in a manner to be described. As will be understood, the expanded air and products of combustion, after passing through the blades 17' of the turbine 17 to effect rotation of the latter, are discharged through the nozzle 22 to effect propulsion of an aircraft in which the engine may be mounted. In the following description and claims, the tail pipe chamber is meant to include the interior generally of both the tail cone 20' and tail pipe 20.

The various accessories which go to make up the complete power plant or turbojet engine 10 are usually mounted at the front of the engine on a suitable streamlined casing 23. To more clearly bring out the features of the invention, however, the thrust augmentation or afterburning fuel metering system and coacting controls are removed from the casing and illustrated diagrammatically in operative relation to the engine 10.

The main fuel control system, or the one for supplying fuel to the burner nozzles 15, may be of any preferred type and forms no part of the invention; it is shown in block diagram at 24 and receives fuel by way of conduit 25 having mounted therein a fuel pump 25'. A throttle valve 26, usually controlled manually by a pilot or operator through lever 26', regulates flow of fuel to the burner nozzles by way of conduit 27, fuel manifold 28 and individual fuel lines 29.

A control lever is shown at 30; it is mounted for angular or rotational movement on a shaft 31. A bracket member 32 is also mounted for rotational movement on the shaft 31; it has a downwardly projecting arm 33 which is resiliently connected to a follow-up sector 34 through the medium of a pair of opposed springs 35 and 36. At its upper end the bracket 32 terminates in a pair of oppositely disposed arms provided with electrical contacts 37 and 38, which are connected through the medium of circuit wires 39 and 40 to a servo motor 41, the latter being of the direct current reversible type and having secured on its armature shaft 41' a drive gear 42 which is in mesh with a pinion 43 secured on the adjacent end of a shaft 44, the opposite end of the latter carrying a worm 45 which is in mesh with sector gear 46 forming part of the sector 34.

The lever 30 also carries a pair of contacts 47 and 48 which are electrically connected to a battery or other suitable source of power 49 by means of a circuit wire 50.

Movement of the lever 30 to the right or clockwise produces a like movement of bracket 32 and arm 33 and at the same time closes the circuit to the servo motor 41, causing the latter to rotate in a direction which will produce a follow-up movement of the sector 34. When the latter rotates to a point where contact is broken between the contacts 48 and 38, the motor 41 stops; but during this period of rotation of the segment 34, electrical contact will be maintained due to the action of the springs 35 and 36. Movement of the lever 30 to the left or in a counterclockwise direction will produce like rotation of the sector 34 until the circuit to motor 41 is broken by movement of the said sector.

A thrust augmentation fuel regulator and metering device is generally indicated at 51; it is illustrated as being entirely independent of the main fuel control 24. It comprises a suitable casing or housing having therein a diaphragm 52 which divides the casing into a pair of chambers 53 and 54. The diaphragm carries a regulator valve 55 which controls an orifice 56, through which fuel may pass from supply conduit 56' to the chamber 53. A suitable pressurizing means such as the pump 57 and coacting by-pass maintains the supply of fuel under a substantially constant delivery pressure. This pump is shown as driven by a motor 57' which may be continuously energized from a power source 57a but which is preferably under selective control by a switch 57b so as to be driven only while the afterburning system is in use. The chamber 53 is in communication with the chamber 54 by way of a passage 58 having a restriction 58' therein, said passage and restriction forming part of a density compensating circuit in a manner to be described. The diaphragm 52 is maintained under a substantially constant differential pressure by means of a spring 59 which is preferably adjustable through the medium of a lever 60 engaging a backing plate 61.

Thrust augmentation or afterburning fuel flows from the chamber 53 through metering orifice 62 into valve chamber 63 and thence by way of conduit 64 to an afterburning fuel manifold 65, the latter supplying fuel to a series of discharge nozzles 66. It will be noted that the manifold or nozzle ring 65 is located exteriorly of the tail pipe and as a consequence it is not subjected to the intense heat which prevails within the latter. Hence it will not become fouled or clogged with carbon due to residual fuel standing therein after the fuel supply has been cut off.

As many of the nozzles 66 as may be desired and found necessary are utilized. Each nozzle is located directly in the lee of a combined shield and distributor member or jet bar 67. These are preferably made of suitable heat resistant material and may take the shape illustrated in Figure 2; they are located in the high temperature, high velocity discharge zone of the exhaust gases passing through the turbine blades just upstream of the nozzles 66 so that the fuel discharged from the nozzles will contact the specially contoured surfaces 67' of the bars and be caused to flow, due in part to surface or skin tension, both laterally in opposite directions and radially inward, the exhaust gases encountering the droplets of fuel and distributing it in a fine spray throughout the area of the tail pipe chamber. This atomizing action will take place even though the delivery from each nozzle 66 is in the form of a large stream at a relatively low pressure. By using this means of fuel atomization and distribution, the discharge nozzles need not be projected into the high temperature zone of the tail pipe chamber to any material extent and they are therefore protected in the same manner as the manifold ring 65.

The metering orifice 62 is controlled by a throttle valve 70 which is normally urged towards retracted position by means of a spring 71. This valve 70 is operatively connected to the follow-up sector 34 by means of an arm 72, link 73 and bell crank lever 74 pivotally anchored at 75. When the follow-up sector 34 rotates in a clockwise direction, it tends to open the valve 70, and when it rotates in a counterclockwise direction, it tends to close said valve.

To automatically vary the rate of feed of thrust augmentation fuel with changes in pressure and temperature and therefore altitude, an aneroid or bellows 76 is mounted in a chamber 77 and at its movable end carries a needle 78 which controls the area of an orifice 79 between the regulator chamber 54 and valve chamber 80, the latter communicating by way of a passage 81 with the fuel conduit 64 downstream of the metering restriction 62. The chamber 77 in which the aneroid 76 is located is preferably vented to ram pressure and temperature by means of passage or conduit 77'. The bellows 76 is partially evacuated and loaded in a manner such as to be responsive to changes in both temperature and pressure. For a method of loading a bellows of this type, see U. S. patent to Mock No. 2,376,711.

The chamber 53 and passage or metered fuel conduit 64 are connected by two parallel flow passages, the orifice or restriction 62 and chamber 63 constituting one passage and passage 58, fixed restriction 58', chamber 54, variable orifice 79, valve chamber 80 and passage 81 constituting the other. With this arrangement the drop in pressure from chamber 53 to conduit 64 across feed restriction 62 will always be equal to the sum of the drop in pressure from chamber 53 to chamber 54 across the fixed orifice 58' and the drop from chamber 54 to conduit 64 across variable orifice 79. The substantially constant drop across fixed orifice 58' as determined by spring 59 creates a constant rate of fuel flow through fixed orifice 58' which must also flow through variable orifice 79. The rate of flow through orifice 79 thus being substantially constant, the drop in pressure thereacross will vary substantially inversely as the square of the effective area thereof as determined by needle 78 controlled by bellows or capsule 76. As heretofore noted, the spring 59 maintains a substanially constant differential across diaphragm 52. As a consequence, the regulator 51 functions to establish an absolute pressure in chamber 53 which is greater than the pressure in chamber 54 by the pressure equivalent of spring 59, and at the same time it establishes an absolute pressure in chamber 54 sufficiently greater than the pressure in conduit 64 as to cause fuel to be forced through the available area of variable orifice 79 at a rate determined by the fixed orifice 58' and the constant head across the latter orifice. The metering head across the feed restruction 62 is therefore equal to the sum of the constant head across orifice 58' plus the variable head across orifice 79.

The quantity of fuel supplied to the manifold 65 and nozzles 66 may be varied by adjusting valve 70 to vary the area of the feed restriction 62, and/or by varying the head (pressure in chamber 53 minus pressure in conduit 64) causing flow, which is automatically varied as the capsule 76 moves in response to changes in pressure and temperature. Opening or closing movement of valve 70 momentarily varies the pressure in chamber 53 and consequently changes the differential across diaphragm 52 from the value set by spring 59; however, the valve 55 is immediately repositioned to restore the differential across said diaphragm and also across the feed restriction 62, the latter differential thereafter being maintained substantially constant at a given position of the density needle 78. Should there be a decrease in pressure due to a gain in altitude or an increase in intake air temperature, capsule 76 expands, thereby increasing the effective area of orifice 79 and correspondingly decreasing the head across this orifice. This produces a corresponding reduction in head across the feed restriction 62 and results in a diminishing flow of fuel to the nozzles 66; an increase in pressure or a decrease in temperature producing the opposite effect.

The follow-up sector 34 is also operatively connected to mechanism for varying the area of the reaction jet or exhaust nozzle 22. Such mechanism may comprise a suitable arrangement of gate valves contoured and supported to withstand the pressures to which they would normally be subjected. In the present instance there are a pair of such valves, 83 and 84, mounted on suitable bearings such as trunnions or short shafts 85 and 86. Also secured on said shafts are intermeshing segmental gears 87 and 88. An arm 89 is secured at one end on the shaft 86 and at its opposite end connects by means of a link 90, lever 90', which is fulcrumed at 90'', and link 91' with an arm 91 secured on a shaft 92. Another arm 93 is secured on the shaft 92 and is pivotally connected to the one end of a link 94, the opposite end of the latter being pivotally connected to the one end of a lever 95 which is fulcrumed at 96 and has the opposite end thereof pivotally connected to a link 97 which extends upwardly and is pivotally connected to the arm 72. Thus, when the sector 34 is rotated by the servo motor 41, it not only acts to adjust the fuel valve 70, but it also acts to open or close the adjustable gate valves 83 and 84, thereby coordinating (at least approximately) the area of the reaction jet or exhaust nozzle with the rate of fuel feed.

It is desirable that the two principal factors to be controlled, viz. reaction jet or exhaust nozzle area and the rate of fuel feed, should be automatically correlated as per a predetermined schedule if maximum engine efficiency is to be realized. Thus, should the rate of afterburning fuel feed increase faster than a prescheduled rate of increase in reaction jet or exhaust nozzle area, the turbine will tend to slow down due to increased back pressure and this in turn may throw the engine out of balance with respect to both pressure and temperature operating characteristics. On the other hand, should the reaction jet or exhaust nozzle area increase faster than a prescheduled rate of fuel feed, a loss in thrust efficiency may result. Also, the rate of change in fuel feed should be gauged in view of the time required to actuate the exhaust nozzle gate valves, which latter operation may require considerable force and more or less complicated actuating mechanism so that a certain amount of time lag must be accepted as an unavoidable factor. In the preferred form of the invention, the rate of fuel feed is the factor sensed by the pilot while the correlation of exhaust nozzle area is determined by interconnecting mechanism which may in itself only approximate the scheduled rate of change but which is subject to correction automatically by means responsive to an engine operating condition or media having a functional relation to the correct rate of change.

In arriving at a suitable corrective factor, I have found that if a certain ratio is maintained between internal tail pipe pressure and ram or impact pressure, based on an efficiency average for the various flight conditions with a selected minimum exhaust nozzle area and no tail pipe burning, operation of the afterburning system will result in a minimum of interference with normal engine efficiency. To obtain this ratio, a conduit 100 is connected to a source of tail pipe pressure at point 101 while conduit 102 is connected to a source of ram or impact pressure. A pair of pressure responsive bellows or capsules 103 and 104, having a predetermined balanced relation with one another, are provided and are interconnected by slide rod or bar 105. The bellows 103 is located in a chamber 106 to which ram pressure is communicated direct from conduit 102 by way of passage or conduit 107; while bellows 104 is located in a chamber 108 indirectly connected to tail cone pressure by way of passage 109, chamber 110, variable orifice 111, chamber 112 and conduit 100. The area of orifice 111 is controlled by a needle valve 113, connected to the movable end of temperature bellows or capsule 114, responsive to changes in compressor inlet temperature, and located in a chamber 115. A thermal element 116 communicates compressor inlet or ram temperature ($T_1$) to bellows 114. A calibrated bleed 117 vents chamber 110 to conduit 102. A condensation trap or small condenser, shown diagrammatically at 118, may be utilized to catch and condense moisture that may result from a reduction in temperature of the air taken off from the tail pipe chamber at the point 101, to thereby prevent water from accumulating and possibly freezing in the aneroid system.

The slide rod or bar 105 carries a contact 120 which is electrically connected into the circuit by wire 121; it is adapted to engage spaced contacts 122 and 123 which are electrically connected by wires 124 and 125 to a servo motor 126, which is of the reversible type and has the armature shaft 127 thereof provided with a drive pinion or gear 128 in mesh with gear 129, the latter in turn being in mesh with the teeth of a rack bar 130 mounted for sliding movement in brackets 131 projecting from a suitable support 132. At its lower end, the rack bar 130 carries the pivot pin or bearing 96 which provides a fulcrum for the lever 95.

The aneroids or pressure bellows 103 and 104 are normally balanced against one another for a given ratio of compressor intake or ram pressure and internal tail pipe pressure beyond the turbine. Should the rate of feed of afterburning fuel during afterburning become inconsistent with the scheduled rate based on this ratio, the said aneroids will become unbalanced, moving contact 120 into engagement with 122 or 123 and causing the servo motor 126 to rotate in a direction which will either raise or lower the fulcrum or pivot 96 and open or close the gate valves 83, 84; a similar operation ensuing should the reaction jet or exhaust nozzle area tend to increase at a rate inconsistent with the rate of fuel feed.

Since changes in compressor inlet temperature have the effect of proportionally varying the compressor discharge pressure, the temperature bellows 114 is provided to maintain the prescheduled ratio constant; it adjusts the pressure in chamber 108 as a function of compressor inlet temperature and insures that the pressures acting on bellows 104 will vary in direct relation to changes in the pressures acting on bellows 103.

To insure prompt ignition of the afterburning fuel, an ignition circuit is provided. In the form shown in Figure 1, the ignition fuel is taken from the regulator 51 by a conduit 135 having a restriction 136 therein. The conduit 135 conducts fuel to an ignition fuel manifold 137 which is provided with one or more nozzles 138 projecting through the wall of a selected ignition burner or burners of the main burner system. One ignition burner may be sufficient, or two or more may be utilized. In the present instance, it will be assumed that two burners are to be supplied with afterburning ignition fuel, the selected burners being 180° apart. Flow of fuel through the conduit 135 may be cut off by a solenoid valve 139 controlling an orifice 140. This valve is of the normally closed type, being urged towards closed position by means of a spring 141 and moved towards open position through energization of a solenoid coil 142, which is connected by means of wire 142', switch 143, wire 144, switch 143' and wire 144' with the positive side of the main circuit. The switch 143' is of the thermal type, being controlled by a thermal element such as liquid filled temperature bulb 145 which projects into the tail pipe 20 and acts through a suitable temperature responsive fluid in chamber 146 to raise a spring pressed piston 147 and open the switch 143' upon a rise in temperature beyond a predetermined value, said latter switch closing when the temperature lowers below such value, as during normal engine operation with the thrust augmentation system idle.

The switch 143 is of the intermittent type; it is operated by a motor 148 connected into the positive side of the circuit by means of wire 149 extending from the wire 144. A spring 150 normally urges the switch 143 towards closed position against the active surface of a cam 151, which is adjustably secured on a jack shaft 152 driven from the armature shaft of the motor 148 through suitable change speed gearing 153. To insure an open position of the switch 143, and hence a closed position of valve 139, when the motor 148 stops, a solenoid plunger 154 is provided; it is normally urged toward a switch opening position by spring 155 and is held in retracted position by a solenoid coil 156, energized from a circuit wire 157, which is connected to wire 149.

When switch 143' is closed, current may flow to motor 148 by way of wires 144', 144 and 149. Rotation of motor 148 produces rotation of switch cam 151, which intermittently opens and closes switch 143 and this in turn produces an intermittent opening and closing of valve 139. When line wires 144 and 149 are energized, solenoid coil 156 is likewise energized, retracting plunger 154 clear of interference with operation of switch 143; but when switch 143' is opened and the circuit to the motor 148 and coil 156 broken, spring 155 forces the plunger 154 against switch 143, holding the latter open. Thus, whenever motor 148 is stopped, the valve 139 which controls flow of ignition fuel to the ignition burners is closed.

The reason for making the switch 143 of the intermittent type is to avoid a continuous injection of ignition fuel into the main burner system and possibly overheating the latter or parts thereof during the ignition period.

It will be assumed that the thermal switch 143' is closed as long as the afterburning system is inactive. Movement of the lever 30 to the right completes the circuit through the wires 144', switch 143', wires 144 and 149 to the motor 148, causing the latter to rotate. This results in an intermittent or periodic closing of the switch 143 and a like intermittent or periodic energization of solenoid coil 142, causing the solenoid valve 139 to also open intermittently or periodically and admit a sufficient quantity of added fuel into the two afterburning ignition burners to cause a spurt of flame to be projected outwardly through the turbine into the region of the afterburning nozzles 66. This ignition fuel is, of course, in addition to the main fuel supply to the burners; however, since it is only intermittently injected and of brief overall duration, it does not materially increase the temperature in the main burner system, which would ordinarily already be at or near the peak since the engine would probably be operating at maximum speed. When the afterburning fuel is ignited and the temperature in the tail pipe increases beyond a predetermined value, the thermal switch 143' opens the circuit to the motor 148, and the latter stops. It will be noted that since the ignition fuel is taken from the regulator unit 51, should the afterburning fuel supply become exhausted, or should for some other reason the regulator unit fail to function and no afterburning fuel flow to the afterburning nozzles, there will also be no ignition fuel to the ignition burners. If desired, the afterburning fuel could be taken direct from the main supply.

*General operation*

To place the thrust augmentation or afterburning system in operation (assuming the engine is already operating normally) the pump 57 is turned on and lever 30 is moved clockwise, or to the right. This moves contact 48 into engagement with 38 and (a) closes the circuit to the motor 148, which intermittently energizes the solenoil coil 142 of valve 139, opening the latter and permitting spurts of ignition fuel to flow to ignition burners of the main burner system, (b) closes the circuit to motor 41 and the latter rotates in a direction to move segment 34 clockwise and open throttle valve 70 to permit fuel to flow to the afterburning fuel manifold 65 and nozzles 66, and (c) such movement of the segment 34 rotates lever 95 in a direction tending to open the gate valves 83, 84. As the afterburning fuel is discharged into the tail pipe chamber by the nozzles 66, it contacts the effective surfaces 67' of the spray bars 67 and spreads laterally and also radially inwardly, whereupon the outflowing gases pick up the fuel and distribute it throughout said chamber. By this time the ignition burners will have projected a spurt of flame outwardly into the region of the spray bars to insure ignition of the afterburning fuel, the ignition fuel being cut off shortly after the afterburning fuel starts to burn due to opening of the thermal switch 143' and interruption of the circuit to the motor 148. Should the flow of afterburning fuel be out of balance with exhaust nozzle area, or vice versa, the correcting system, including the aneroids 103, 104 and 114, will come into play and raise or lower the pivot 96 and adjust the gate valves 83, 84.

The rate of flow of the afterburning fuel is set by the pilot when he sets the lever 30. Thus, movement of the said lever to the right or clockwise first closes the electric control circuit and further movement also swings bracket 32 and arm 33 clockwise, compressing spring 35 and expanding spring 36. The motor 41 will thereupon continue to rotate segment 34 in a follow-up direction until the contacts 38 and 48 separate. To close the throttle valve 70, the lever 30 is moved counterclockwise. This will also result in closing the gate valves 83, 84, or adjustment thereof to a position for normal engine operation.

Although only one embodiment of the invention has been illustrated and described, various changes in form and arrangement of parts may be made to suit requirements. Thus, hydraulic control units may be substituted for electrical where circumstances favor hydraulic application, and in certain instances mechanical connecting linkage may be substituted by servo operation to reduce weight and lost motion.

I claim:

1. In a thrust augmenting system for a turbo-jet engine having a tail pipe chamber and a reaction jet; means for varying the area of the reaction jet, means for metering fuel to said tail pipe chamber, control means for said fuel metering means, means interconnecting said control means and area varying means for coordinating the area varying means and rate of fuel feed according to a prescheduled relation, and means responsive to departure from a preselected engine operating condition to which engine power output is related for modifying said prescheduled relation.

2. In a thrust augmenting system for a turbo-jet engine having a compressor, a tail pipe chamber and a reaction jet; means for varying the area of the reaction jet, means for metering fuel to said tail pipe chamber, control means for said fuel metering means, means interconnecting said control means and area varying means for coordinating the area varying means and rate of fuel feed according to a prescheduled relation, and means operating automatically as a function of a preselected ratio between a gas pressure which varies with variations in ambient pressure and the pressure in said tail pipe chamber for modifying said prescheduled relation.

3. A thrust augmenting system for a turbo-jet engine as claimed in claim 2, wherein means responsive to changes in an engine operating condition to which engine power output is related is provided for maintaining said ratio substantially constant.

4. A thrust augmenting system for a turbo-jet engine as claimed in claim 2, wherein means responsive to changes in an air temperature which varies with variations in ambient temperature are provided for maintaining said ratio substantially constant.

5. A thrust augmenting system for a turbo-jet engine having a compressor, a gas turbine, a tail pipe chamber and a reaction jet, wherein the gases of combustion after passing through the turbine and tail pipe chamber are discharged through said jet to obtain a propulsion effect; means for varying the area of the reaction jet, means for feeding fuel to said tail pipe chamber including valve means, means operatively connecting said valve means and area varying means, means operable as a function of an engine operating condition to which engine power output is related, and an operative connection between said last mentioned means and said area varying means, whereby said valve means and said area varying means are adjustable in unison in accordance with a prescheduled relation.

6. A thrust augmenting system for a turbo-jet engine having a compressor, a tail pipe chamber and a reaction jet and wherein the gases of combustion after passing through the turbine and tail pipe chamber are discharged through said jet to obtain a propulsion effect; means for varying the area of the reaction jet, means for feeding fuel to said tail pipe chamber including a flow regulating valve, means operatively connecting said valve and area varying means in a manner such that the valve and said means are adjustable in unison, and means for automatically maintaining a correlated rate of fuel feed and reaction jet area, said latter means being responsive to a pre-selected ratio of two engine operating gas pressures, each of which gas pressures varies with variations in ambient pressure.

7. A thrust augmenting system for a turbo-jet engine as claimed in claim 6, wherein said valve is under selective manual control and said means for maintaining a correlated rate of fuel feed and reaction jet area is arranged to adjust the area varying means.

8. A thrust augmenting system for a turbo-jet engine having a compressor, a tail pipe chamber and a reaction jet and wherein the gases of combustion after passing through the turbine and tail pipe chamber are discharged through said jet to obtain a propulsion effect; means for varying the area of the reaction jet, means for feeding fuel to said tail pipe chamber including a flow regulating valve, means operatively connecting said valve and area varying means in a manner such that the valve and said means are adjustable in unison, means for automatically maintaining a correlated rate of fuel feed and reaction jet area including a device responsive to departure from a predetermined differential between a gas pressure which varies with variations in ambient pressure and the pressure in said tail pipe chamber, and means responsive to changes in an engine operating temperature for modifying said differential.

9. A thrust augmenting system for a turbo-jet engine having a compressor, a tail pipe chamber and a reaction jet and wherein the gases of combustion after passing through the turbine and tail pipe chamber are discharged through said jet to obtain a propulsion effect; means including a valve for varying the area of the reaction jet, means including a fuel conduit having a variable restriction therein for supplying fuel to said tail pipe chamber, a fuel control valve for controlling the area of said restriction, means operatively interconnecting said fuel valve and said jet area valve in a manner such that the rate of fuel feed to said chamber and the area of the reaction jet are adjustable in unison, means operable in the event of a departure from a preselected ratio between two engine operating pressures, each of which varies with variations in ambient pressure, for modifying the adjustment of the jet area valve, and means responsive to changes in an engine operating temperature for maintaining said ratio substantially constant.

10. A thrust augmenting system for a turbo-jet engine having a compressor, a tail pipe chamber and a reaction jet and wherein the gases of combustion after passing through the turbine and tail pipe chamber are discharged through said jet to obtain a propulsion effect; means including a valve for varying the area of the reaction jet, means including a fuel conduit having a variable restriction therein for supplying fuel to said tail pipe chamber beyond said turbine, a fuel metering valve for controlling the area of said restriction, means operatively interconnecting said fuel valve and said jet area valve in a manner such that the rate of fuel feed to said chamber and the area of the reaction jet are adjustable in unison, pressure responsive means operatively connected to said jet area valve, said latter means being positioned in accordance with the ratio between a pressure which varies with variations in ambient pressure and tail pipe chamber pressure and operable to adjust said jet area valve, and means responsive to changes in an engine operating temperature for maintaining said ratio at a preselected constant value.

11. A thrust augmenting system for a turbo-jet engine as claimed in claim 10, wherein said pressure responsive means comprises a pair of interconnected aneroids, one having a pressure connection with the compressor inlet and the other having a similar connection with the tail pipe chamber, and the means responsive to changes in temperature is arranged to modify the action of said aneroids.

12. A thrust augmenting system for a turbo-jet engine having a compressor, a tail pipe chamber and a reaction jet and wherein the gases of combustion after passing through the turbine and tail pipe chamber are discharged through said jet to obtain a propulsion effect; a valve for varying the area of the reaction jet, means for supplying fuel to the tail pipe chamber including a fuel conduit having a variable restriction therein, a valve for varying the area of said restriction, a manual control device, and means interconnecting said fuel valve, jet area valve and control device for simultaneously adjusting the rate of fuel feed and the area of said jet, a servomotor also having an operative connection with the jet area valve and operable to override said interconnecting means, and means operable in response to variation from a preselected ratio of engine operating pressures which vary with variations in ambient pressure for controlling said servomotor.

13. A thrust augmenting system for a turbo-jet engine as claimed in claim 12, wherein the means for controlling said servomotor comprises a pair of pressure responsive devices balanced against one another, one of said devices having a pressure connection with the compressor inlet and the other with the tail pipe chamber, and means responsive to changes in compressor inlet temperature is provided for modifying the effective action of said devices.

14. In a thrust augmenting system for a turbo-jet engine having a gas turbine, a burner system including a plurality of burners, a tail pipe chamber, and a reaction jet; first means for supplying fuel to said burners for normal engine operation, means for metering fuel directly to said tail pipe chamber, and means for insuring ignition of the fuel discharge into said tail pipe chamber comprising second means for supplying additional fuel to at least one of said burners, said second means being so arranged that the additional fuel supplied to the burner is ignited therein to cause a spurt of flame to be projected outwardly through the turbine into said tail pipe chamber.

15. In a thrust augmenting system for a turbo-jet engine having a burner system, a tail pipe chamber and a reaction jet, said burner system including a plurality of individual burners and means for supplying fuel to the burners for normal engine operation; means for supplying fuel to said tail pipe chamber, and means for insuring ignition of the tail pipe fuel including a fuel conduit arranged to discharge fuel into at least one but not all of the burners in addition to the normal supply to produce a spurt of flame outwardly through the turbine into the tail pipe chamber, and means for automatically shutting off the ignition fuel.

16. In a thrust augmenting system for a turbojet engine having a burner or generator, a tail pipe chamber, a reaction jet and means for supplying fuel to the burner for normal engine operation; means for supplying fuel to said tail pipe chamber, and means for insuring ignition of the fuel in said chamber including means for intermittently discharging extra fuel into the burner to produce spurts of flame outwardly through the turbine into the tail pipe chamber, the ignition fuel being injected intermittently during the start of the thrust augmenting system to avoid overheating of the burner system which might otherwise result should the ignition fuel be fed continuously to said burner.

17. In a thrust augmenting system for a turbojet engine having a burner system including a plurality of individual burners, a tail pipe chamber, a reaction jet and means for supplying fuel to the burners for normal engine operation; means for supplying fuel direct to said tail pipe chamber, and an ignition circuit for the thrust augmenting fuel comprising a conduit for supplying added fuel to at least one of said burners, and means for periodically interrupting the flow of fuel through said conduit to thereby inject the fuel into the burner noncontinuously and avoid overheating of the burner system.

18. In a thrust augmenting system for a turbojet engine having a burner or generator, a tail pipe chamber, a reaction jet and means for supplying fuel to the burner for normal engine operation; means for supplying thrust augmenting fuel direct to said tail pipe chamber, and means for insuring the ignition of the fuel in said chamber including means for discharging extra fuel into any one or a selected number of the burners to produce spurts of flame outwardly through the turbine into the tail pipe chamber, and means for automatically cutting off the flow of ignition fuel to the burners after the thrust augmenting system starts to operate.

19. In a system for augmenting the thrust developed by a turbojet engine having a main burner by burning fuel in the tail pipe chamber of the engine, the method which consists in supplying thrust augmenting fuel directly to the tailpipe chamber and igniting said thrust augmenting fuel by temporarily injecting fuel into the main burner in addition to the normal supply to project a spurt of flame outwardly into the tail pipe chamber and ignite the thrust augmenting fuel.

20. A method as claimed in claim 19, wherein the added fuel is injected intermittently to avoid possible overheating in the burner.

21. A thrust augmenting system for a turbojet engine having a compressor, a tail pipe chamber and a reaction jet and wherein the gases of combustion after passing through the turbine and tail pipe chamber are discharged through said jet to obtain a propulsion effect; means for varying the area of the reaction jet, means for metering fuel to said tail pipe chamber, means for coordinating the area varying means and rate of fuel feed, and means operable as a function of an engine pressure operatively connected to said coordinating means which varies in variations in ambient pressure.

22. In a power control system for gas turbine engines having a tailpipe terminating in a reaction jet and movable means for varying the area of the jet, means for controlling the position of the movable means and thereby the area of the jet including pressure responsive means operatively connected to said movable means, said pressure responsive means being positioned in accordance with the ratio of two engine operating gas pressures and operable to adjust the movable means, each of said gas pressures being variable as a function of ambient air pressure, and means responsive to variations in an engine operating temperature for modifying one of the gas pressures to which said pressure responsive means responds.

23. In a power control system for gas turbine engines having a tailpipe terminating in a reaction jet and movable means for varying the area of the jet, means for controlling the position of the movable means and thereby the area of the jet including pressure responsive means operatively connected to said movable means, said pressure responsive means being positioned in accordance with the ratio of two engine operating gas pressures and operable to adjust the movable means, each of said gas pressures being variable as a function of ambient air pressure, and means responsive to variations in an engine operating temperature for modifying one of the gas pressures to which said pressure responsive means responds in such a manner that said first mentioned means controls the movable means to effect the maintenance of a substantially constant ratio between said gas pressures.

24. In a power control system for gas turbine engines having a tailpipe terminating in a reaction jet and movable means for varying the area of the jet, first means responsive to the pressure in the tailpipe, second means responsive to a pressure which varies as a function of ambient pressure, said first and second means being operatively connected to each other and to the movable means for controlling the area of the jet, and third means responsive to an engine operating condition to which engine power output is related operatively connected to one of the aforementioned means for maintaining a substantially constant ratio between the pressures to which said first and second means respond.

25. In a power control system for gas turbine engines having a compressor, a tailpipe terminating in a reaction jet and movable means for varying the area of the jet, means for controlling the position of the movable means and thereby the area of the jet in such a manner that a substantially constant preselected pressure ratio is maintained between compressor inlet pressure and tailpipe pressure during all conditions of engine operation comprising means responsive to compressor inlet pressure and tailpipe pressure operatively connected to the movable means for adjusting the area of the jet, and means responsive to compressor inlet temperature operatively connected to said pressure responsive means for modifying the action thereof.

26. In a power control system for gas turbine engines having a tailpipe terminating in a reaction jet and movable means for varying the area of the jet, means operatively connected to the movable means and automatically operative in the event of a departure from a preselected ratio between two engine operating pressures for modifying the area of the jet, each of said operating pressures varying with variations in ambient pressure, and means responsive to variations in an engine operating temperature operatively connected to said last mentioned means for maintaining said pressure ratio substantially constant.

27. In a power control system for a gas turbine engine having a compressor, a tailpipe terminating in a reaction jet and movable means for varying the area of the jet, first means responsive to the pressure in the tailpipe, second means responsive to a pressure which varies as a function of ambient pressure, said first and second means being operatively connected to each other and to the movable means for controlling the area of the jet, and third means responsive to an engine operating condition to which engine power output is related operatively connected to one of the aforementioned means for maintaining a substantially constant ratio between the pressures to which said first and second means respond irrespective of variations in said engine operating condition.

28. A system as claimed in claim 27 wherein the pressure to which said second means responds is the pressure of the air flowing to the compressor.

29. A system as claimed in claim 24 wherein the pressure to which said second means responds is compressor inlet pressure.

References Cited in the file of this patent

UNITED STATES PATENTS

| | | |
|---|---|---|
| 971,516 | Beaver | Oct. 4, 1910 |
| 985,793 | Fabel | Mar. 7, 1911 |
| 1,016,018 | Kunkel | Jan. 30, 1912 |
| 1,052,588 | Janicki | Feb. 11, 1913 |

(Other references on following page)

UNITED STATES PATENTS

| | | |
|---|---|---|
| 2,378,037 | Reggio | June 12, 1945 |
| 2,411,895 | Poole | Dec. 3, 1946 |
| 2,457,595 | Orr | Dec. 28, 1948 |
| 2,498,939 | Bobier | Feb. 28, 1950 |
| 2,506,611 | Neal et al. | May 9, 1950 |
| 2,511,385 | Udale | June 13, 1950 |
| 2,514,248 | Lombard | July 4, 1950 |
| 2,518,000 | Goddard | Aug. 8, 1950 |
| 2,520,434 | Robson | Aug. 29, 1950 |
| 2,520,967 | Schmitt | Sept. 5, 1950 |
| 2,525,207 | Clarke et al. | Oct. 10, 1950 |
| 2,537,772 | Lundquist | Jan. 9, 1951 |
| 2,540,642 | Allen et al. | Feb. 6, 1951 |
| 2,545,703 | Orr | Mar. 20, 1951 |
| 2,565,854 | Johnstone et al. | Aug. 28, 1951 |
| 2,580,962 | Sédille | Jan. 1, 1952 |
| 2,636,344 | Heath | Apr. 28, 1953 |

FOREIGN PATENTS

| | | |
|---|---|---|
| 919,004 | France | Nov. 18, 1946 |
| 920,910 | France | Apr. 27, 1947 |
| 587,558 | Great Britain | May 7, 1947 |
| 614,341 | Great Britain | Dec. 14, 1948 |